US012486012B2

(12) United States Patent
Konishi et al.

(10) Patent No.: US 12,486,012 B2
(45) Date of Patent: Dec. 2, 2025

(54) ELECTRIC OUTBOARD MACHINE

(71) Applicant: HONDA MOTOR CO., LTD., Tokyo (JP)

(72) Inventors: Hiromichi Konishi, Saitama (JP); Norikazu Kawai, Saitama (JP); Tomoyuki Suzuki, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 446 days.

(21) Appl. No.: 18/189,226

(22) Filed: Mar. 24, 2023

(65) Prior Publication Data

US 2023/0322348 A1 Oct. 12, 2023

(30) Foreign Application Priority Data

Mar. 28, 2022 (JP) ................................. 2022-051497

(51) Int. Cl.
*B63H 20/06* (2006.01)
*B60L 15/20* (2006.01)
*B60L 50/60* (2019.01)

(52) U.S. Cl.
CPC .............. *B63H 20/06* (2013.01); *B60L 15/20* (2013.01); *B60L 50/66* (2019.02)

(58) Field of Classification Search
CPC ........ B63H 20/02; B63H 20/06; B63H 20/08; B63H 20/007; B63H 21/17; B63H 23/24
See application file for complete search history.

(56) References Cited

U.S. PATENT DOCUMENTS

| | | | | |
|---|---|---|---|---|
| 9,017,122 B2 * | 4/2015 | Harada | F02M 35/10013 440/88 A |
| 9,475,563 B2 * | 10/2016 | Shomura | B63H 20/14 |
| 12,304,330 B1 * | 5/2025 | Hickcox, III | B63H 23/34 |
| 2007/0232157 A1 * | 10/2007 | Lee | B63H 20/007 440/6 |
| 2014/0046515 A1 * | 2/2014 | Mizutani | B63H 20/08 701/21 |
| 2016/0039510 A1 * | 2/2016 | Shomura | B63H 20/14 440/6 |
| 2018/0362131 A1 * | 12/2018 | He | B63H 20/12 |
| 2021/0245853 A1 * | 8/2021 | Yamaguchi | B63H 21/213 |
| 2021/0293209 A1 * | 9/2021 | Yoshigasaki | B63H 20/32 |
| 2022/0089264 A1 * | 3/2022 | Bruestle | B63H 20/14 |
| 2023/0026711 A1 * | 1/2023 | Saruwatari | B63H 20/12 |

(Continued)

FOREIGN PATENT DOCUMENTS

JP 2021146932 A 9/2021

*Primary Examiner* — Joshua E Freeman
(74) *Attorney, Agent, or Firm* — CKC & PARTNERS CO., LLC

(57) ABSTRACT

The present disclosure improves impact resistance of an electric outboard machine. The electric outboard machine includes an outboard machine body and an attachment. The attachment attaches the outboard machine body to a rear part of a boat. The outboard machine body includes a propeller, an electric motor that drives the propeller, and a controller that controls the motor. The controller is located between the motor and the attachment. If another boat collides with the boat from behind, the controller arranged between the motor and the attachment is easily protected from the impact upon rear-end collision. This can improve impact resistance of the electric outboard machine.

9 Claims, 7 Drawing Sheets

(56) References Cited

U.S. PATENT DOCUMENTS

| | | | | |
|---|---|---|---|---|
| 2023/0140525 A1* | 5/2023 | Ikegaya | B63H 20/12 | |
| | | | 701/21 | |
| 2023/0150633 A1* | 5/2023 | Fujiwara | B63H 20/007 | |
| | | | 440/6 | |
| 2023/0242229 A1* | 8/2023 | Yageta | B63H 21/213 | |
| | | | 440/6 | |
| 2024/0092469 A1* | 3/2024 | Miyagi | B63H 21/21 | |
| 2024/0317377 A1* | 9/2024 | Oshita | B63H 21/36 | |

* cited by examiner

ELECTRIC OUTBOARD MACHINE

This application is based on and claims the benefit of priority from Japanese Patent Application No. 2022-051497, filed on 28 Mar. 2022, the content of which is incorporated herein by reference.

BACKGROUND OF THE INVENTION

Field of the Invention

The present invention relates to an outboard machine attached to a rear part of a boat.

Related Art

A general outboard machine includes an engine that uses gasoline as fuel.

Patent Document 1: Japanese Unexamined Patent Application, Publication No. 2021-146932

SUMMARY OF THE INVENTION

Nowadays, however, it has been required to use an electric motor in place of the engine for reduced carbon dioxide emission and low adverse environmental impact. The inventors of the present disclosure have focused on the fact that an electric outboard machine, which is an outboard machine including an electric motor, has room for improvement in impact resistance.

Under these circumstances, the present invention has been achieved to improve the impact resistance of the electric outboard machine.

The inventors have found that the impact resistance of the electric outboard machine improves when a motor of an outboard machine body and an attachment for attaching the outboard machine body to the boat are arranged to sandwich a controller that controls the motor, and have achieved the present invention. The present invention is directed to an electric outboard machine of aspects (1) to (9).

(1) An electric outboard machine, including: an outboard machine body including a propeller, an electric motor that drives the propeller, and a controller that controls the motor; and an attachment for attaching the outboard machine body to a rear part of a boat, wherein the controller is located between the motor and the attachment.

In this aspect, if another boat collides with the boat from behind, the controller arranged between the motor and the attachment is easily protected from the impact of the rear-end collision. This can improve impact resistance of the electric outboard machine.

(2) The electric outboard machine of Aspect (1), wherein the boat is equipped with a battery, a DC cable that supplies power from the battery to the controller is routed, and the power is supplied from the controller to the motor.

In this aspect, it is required to electrically connect the battery of the boat and the controller with the DC cable, and electrically connect the controller and the motor. In this point, the controller located between the boat and the motor can efficiently shorten the DC cable. Compared with when the controller is arranged behind the motor, i.e., when the controller and the battery are arranged to sandwich the motor, no space is required for routing the DC cable above or on the side of the motor. This leads to downsizing of the outboard machine body.

(3) The electric outboard machine of aspect (1) or (2), wherein the controller includes a control circuit that controls the motor and a controller case that houses the control circuit, and the attachment is wider than the controller case in a lateral direction of the boat, and an edge of the attachment in the lateral direction of the boat is located outward of an edge of the controller case in the lateral direction of the boat.

In this aspect, the controller is easily protected from impact applied in the lateral direction of the boat.

(4) The electric outboard machine of any one of aspects (1) to (3), wherein the outboard machine body includes a housing that houses the motor, and the housing is wider than the controller in a lateral direction of the boat, and an edge of the housing in the lateral direction of the boat is located outward of an edge of the controller in the lateral direction of the boat.

In this aspect, the controller is easily protected from impact applied in the lateral direction of the boat.

(5) The electric outboard machine of any one of aspects (1) to (4), wherein a gap is provided between a front surface of the controller and the attachment in a case where no external force is applied to the electric outboard machine in a front-rear direction of the boat.

In this aspect, although impact is applied to the boat from behind, the controller is not crushed between the motor and the attachment unless the gap is lost.

(6) The electric outboard machine of aspect (5), wherein a stopper is provided to one selected from the outboard machine body and the attachment, and, in a case where a forward external force is applied to the electric outboard machine, the stopper contacts the other one selected from the outboard machine body and the attachment before loss of the gap to prevent loss of the gap.

In this aspect, although a forward external force is applied to the electric outboard machine upon rear-end collision, the stopper prevents loss of the gap between the front surface of the controller and the attachment.

(7) The electric outboard machine of aspect (6), wherein the attachment supports the outboard machine body via a damper that absorbs impact in the front-rear direction, and a regulating part that regulates a stroke for the damper to absorb the impact serves as the stopper.

This configuration can avoid adverse effects, such as crushing of the controller when forward impact is excessively absorbed by the damper.

(8) The electric outboard machine of aspect (6) or (7), wherein the outboard machine body includes a protrusion that protrudes forward beyond a front surface of the controller, and the protrusion serves as the stopper.

In this aspect, the stopper can be obtained by providing the outboard machine body with the protrusion that protrudes forward.

(9) The electric outboard machine of any one of aspects (1) to (8), further including: a drive shaft that transmits power of the motor to the propeller, wherein the outboard machine body includes an upper unit including the controller and the motor and a lower unit including the propeller, and in a case of turning to change a traveling direction of the boat, the lower unit rotates about an axis of the drive shaft relative to the upper unit.

In this aspect, when turning the boat, the lower unit rotates relative to the upper unit including the controller and the motor. Thus, the controller and the motor do not rotate, and the cable that supplies the power to the controller and the motor does not rotate. This can reduce damage to the cable. Moreover, there is no need to save space for the cable to bend during the turn, or to make the cable long enough to be able to bend. This leads to downsizing of the outboard machine body.

Aspect (1) can improve the impact resistance of the electric outboard machine. Aspects (2) to (9) referring to aspect (1) provide additional advantages.

DETAILED DESCRIPTION OF THE INVENTION

Embodiments of the present invention will be described below with reference to the drawings. Note that the present invention is not limited to the following embodiment, and modifications can be made as appropriate without departing from the scope of the invention.

Figure 1:
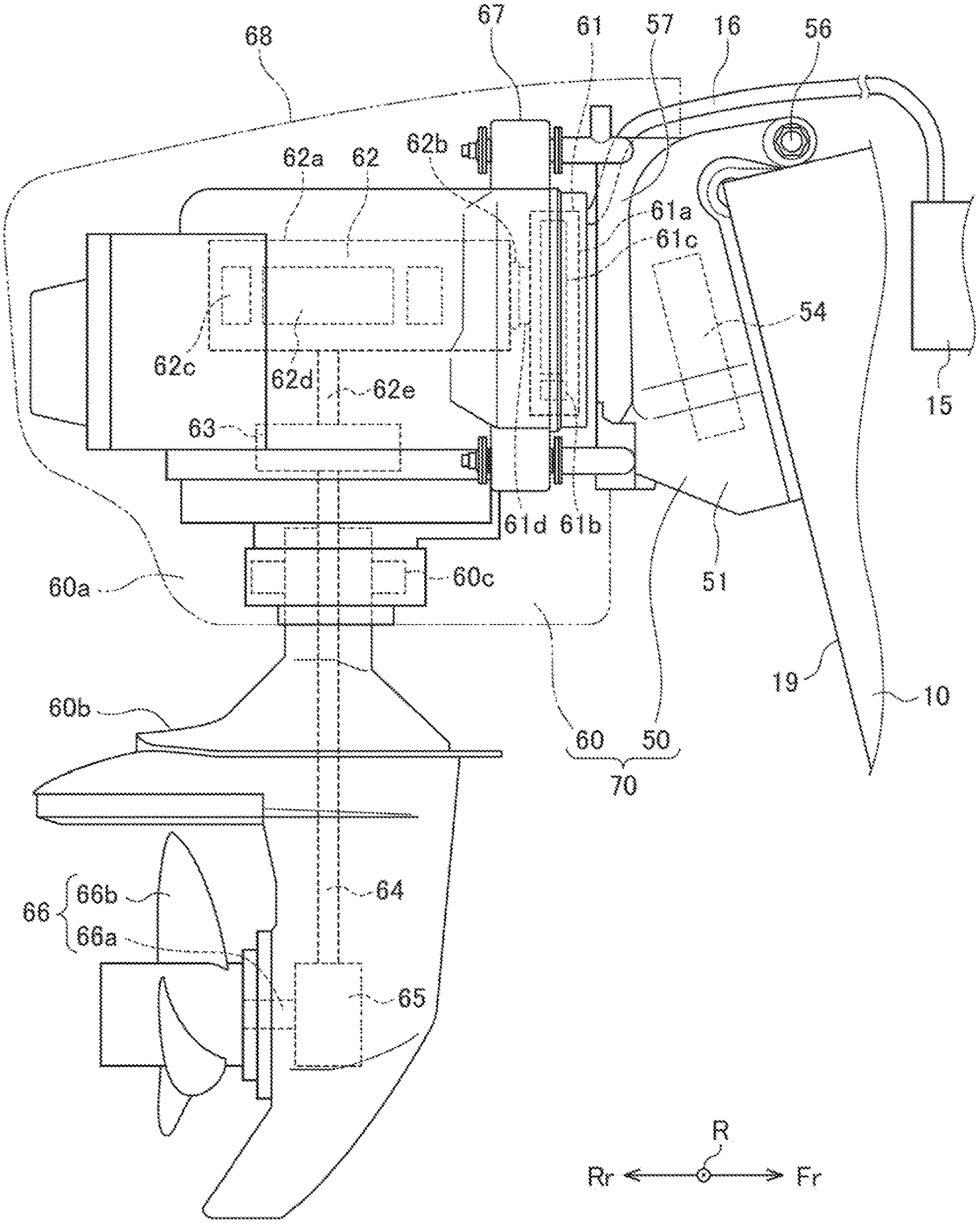
FIG. 1 is a side view illustrating an electric outboard machine of a first embodiment.

FIG. 1 is a side view illustrating an electric outboard machine 70 of a first embodiment. The electric outboard machine 70 is attached to a rear part of a boat 10. Hereinafter, the front side of the boat 10 will be referred to as the "front Fr", the rear side of the boat 10 as the "rear Rr", the left side of the boat facing the front Fr as the "left L", and the right side of the boat facing the front Fr as the "right R". The "left" and "right" of the boat mentioned below may be recognized as the lateral sides of the boat, and the "left-right direction" may be recognized as a "lateral direction" of the boat.

The electric outboard machine 70 includes an outboard machine body 60 and an attachment 50. The attachment 50 attaches the outboard machine body 60 to the rear part of the boat 10. The boat 10 is equipped with a battery 15. A DC cable 16 is routed between the boat 10 and the outboard machine body 60 to supply the power of the battery 15 to the outboard machine body 60.

The attachment 50 includes a fixing part 51, a swivel 57, and a tilt device 54. The fixing part 51 is, for example, a clamping mechanism, and is fixed to an upper part of a transom 19 in the rear part of the boat 10. An upper end of the swivel 57 is rotatably attached to an upper end of the fixing part 51 via a tilt shaft 56 extending in the left-right direction L-R. The swivel 57 supports a front end of the outboard machine body 60. The tilt device 54 allows the swivel 57 to rotate about the tilt shaft 56 relative to the fixing part 51 to tilt the outboard machine body 60. The tilt device 54 will be described in detail later.

The outboard machine body 60 includes a controller 61, a motor 62, a reduction gear 63, a drive shaft 64, a bevel gear 65, a propeller 66, a housing 67, and a cover 68. The housing 67 houses the controller 61, the motor 62, and the reduction gear 63. The cover 68 covers the housing 67 from outside.

The controller 61 is a device for controlling the motor 62, and is arranged in front of the motor 62. Thus, the controller 61 is arranged between the motor 62 and the attachment 50. The controller 61 includes a controller case 61*a*, a control circuit 61*b*, an inverter 61*c*, and a controller connector 61*d*. The controller case 61*a* houses the control circuit 61*b* and the inverter 61*c*. The control circuit 61*b* and the inverter 61*c* are electrically connected to the battery 15 via the DC cable 16. The inverter 61*c* converts DC power supplied from the battery 15 to AC power. The controller connector 61*d* is an output terminal from which the converted AC power is outputted, and is arranged on a rear surface of the controller case 61*a*. The control circuit 61*b* controls the inverter 61*c* based on a command from a pilothouse on the boat 10 to control the motor 62.

The motor 62 is an electric motor, more specifically, an AC motor operated by the AC power. The motor 62 includes a motor case 62*a*, a motor connector 62*b*, a stator 62*c*, a rotor 62*d*, and a motor shaft 62*e*. The motor connector 62*b* is an input terminal from which the AC power is inputted, and is arranged on a front surface of the motor case 62*a*. The controller connector 61*d* and the motor connector 62*b* engage with each other to electrically connect the inverter 61*c* and the motor 62.

The motor shaft 62*e* extends in a vertical direction. The rotor 62*d* is fixed to the motor shaft 62*e* and rotates together with the motor shaft 62*e*. The stator 62*c* allows the rotor 62*d* to rotate by the AC power supplied from the inverter 61*c* to cause the motor shaft 62*e* to rotate.

The drive shaft 64 extends in the vertical direction. An upper end of the drive shaft 64 meshes with a lower end of the motor shaft 62*e* via the reduction gear 63.

The propeller 66 includes a propeller shaft 66*a* extending in the front-rear direction Fr-Rr and a propeller body 66*b* that is fixed to the propeller shaft 66*a* and rotates together with the propeller shaft 66*a*. A front end of the propeller shaft 66*a* meshes with a lower end of the drive shaft 64 via the bevel gear 65. The bevel gear 65 may simply change the direction of rotation of the shaft, or may change the direction of rotation and reduce the rotation speed of the shaft.

The above-described configuration allows the motor 62 to drive the propeller 66. An upper unit 60*a*, which is an upper part of the outboard machine body 60, includes the controller 61, the motor 62, the reduction gear 63, the housing 67, and the cover 68. A lower unit 60*b*, which is a lower part of the outboard machine body 60, includes the bevel gear 65 and the propeller 66. The lower unit 60*b* is attached to be rotatable about an axis of the drive shaft 64 relative to the upper unit 60*a*.

The upper unit 60*a* has a rotation device 60*c* in the housing 67. The rotation device 60*c* allows the lower unit 60*b* to rotate about the axis of the drive shaft 64 relative to the upper unit 60*a* based on a command from the pilothouse 12 to change the propelling direction of the propeller 66 so that the traveling direction of the boat 10 changes. Specifically, the rotation device 60*c* includes, for example, another motor (not shown) different from the motor 62, and transmits the rotatory power of the motor to the lower unit 60*b* via, for example, a worm gear set, so that the lower unit 60*b* rotates about the axis of the drive shaft 64.

Figure 2:
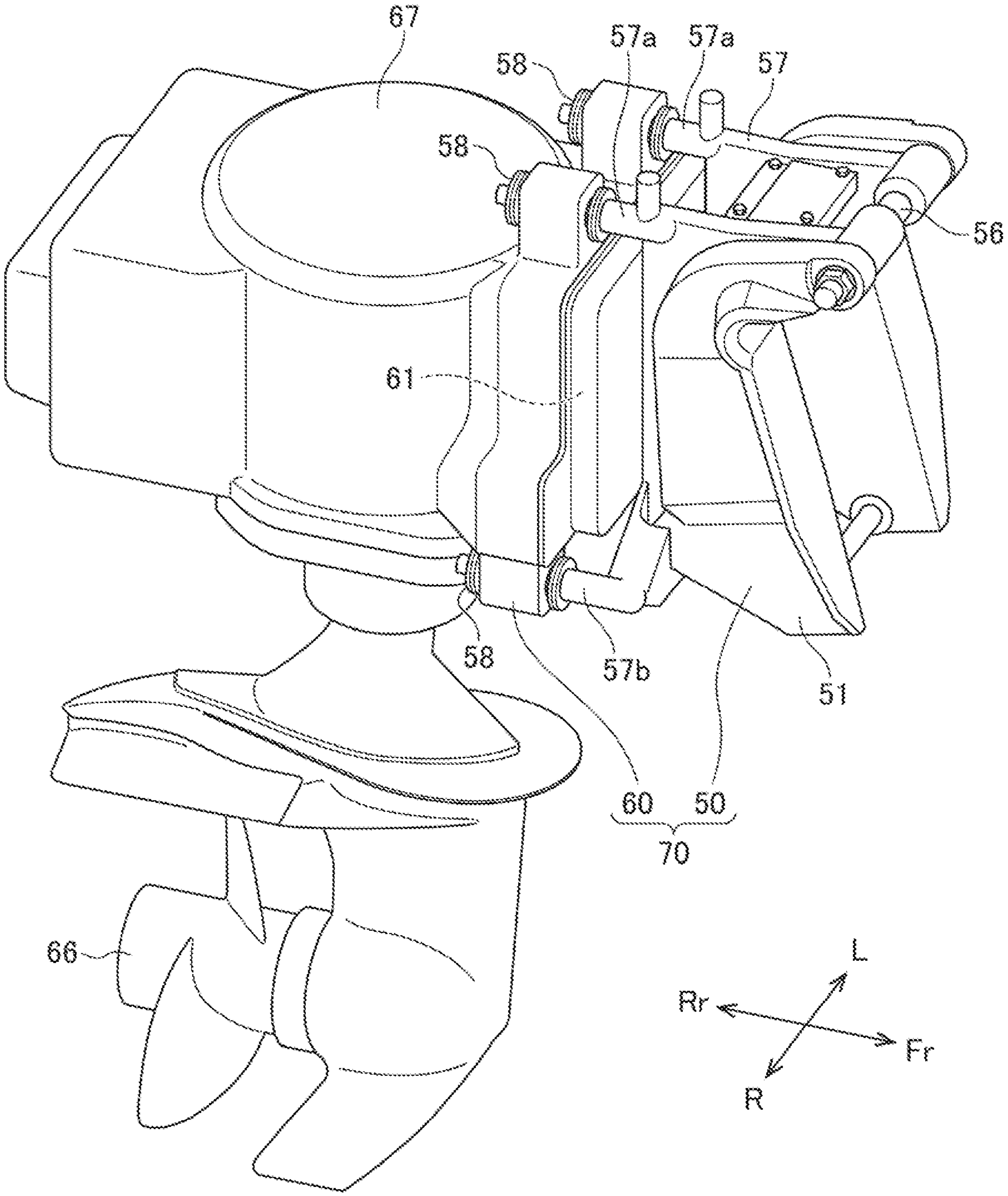
FIG. 2 is a perspective view illustrating the electric outboard machine.

FIG. 2 is a perspective view illustrating the electric outboard machine 70 as observed from the front right side. The swivel 57 includes two upper arms 57*a* and two lower arms 57*b*. The two upper arms 57*a* support a front upper end part of the housing 67 at two points spaced from each other in the left-right direction. The two lower arms 57*b* support a front lower end part of the housing 67 at two points spaced from each other in the left-right direction. Specifically, the two upper arms 57*a* support the front upper end part of the housing 67 above the top end of the controller 61. The two lower arms 57*b* support the front lower end part of the housing 67 below the bottom end of the controller 61.

Figure 3:
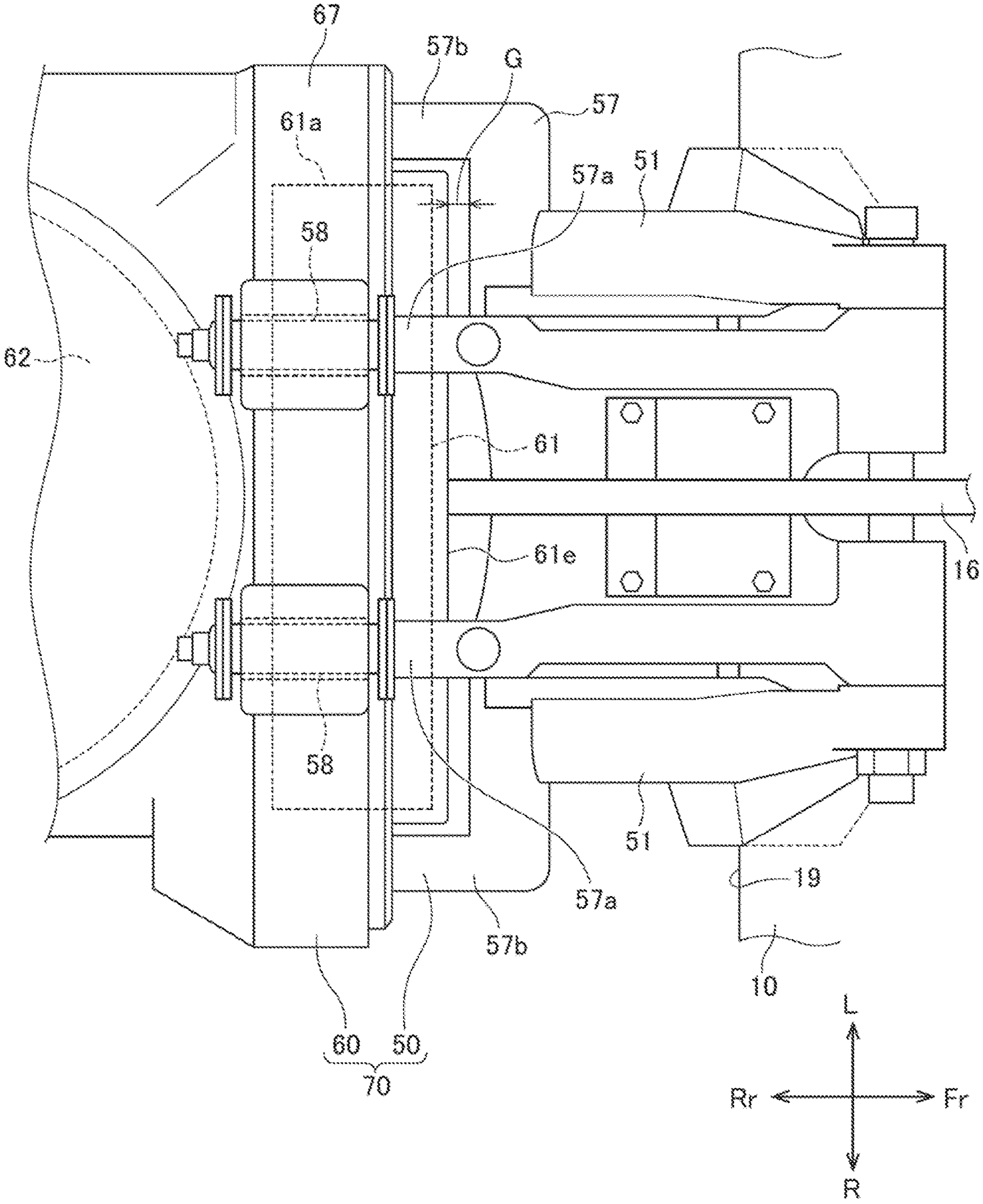
FIG. 3 is a plan view illustrating a connection between an attachment and an outboard machine body.

FIG. 3 is a plan view illustrating a connection between the attachment 50 and the outboard machine body 60 as observed from above. The upper arms 57*a* respectively extend straight to the rear side. The lower arms 57*b* respectively extend outward to the left side and the right side, and then extend to the rear side. Thus, a gap between the two lower arms 57*b* in the left-right direction is larger than a gap between the two upper arms 57*a* in the left-right direction. The attachment 50 thus has, as a width in the left-right direction, a dimension from the left end of the lower arm 57*b* on the left L to the right end of the lower arm 57*b* on the right R.

The controller case 61*a* has, as a width in the left-right direction, a dimension between the left and right end faces of the controller case 61*a*. The housing 67 has, as a width in the left-right direction, a dimension between the left and right end faces of the housing 67.

Each of the attachment 50 and the housing 67 has a larger width in the left-right direction L-R than the controller case 61*a*. Thus, each of the attachment 50 and the housing 67 has left and right edges located outward of left and right edges of the controller case 61*a*. That is, each of the swivel 57 and the housing 67 has the left edge on the left L of the left edge of the controller case 61*a* and the right edge on the right R of the right edge of the controller case 61*a*.

A gap G is provided in the front-rear direction between a front surface of the controller 61 and the swivel 57 when no external force is applied to the outboard machine body 60 in the front-rear direction. The gap G will be referred to as a "protective gap G". The protective gap G protects the controller 61 from a forward external force applied to the outboard machine body 60 upon rear-end collision. Each of the upper arms 57*a* and the lower arms 57*b* supports the front end part of the housing 67 via a damper 58.

Figure 4:
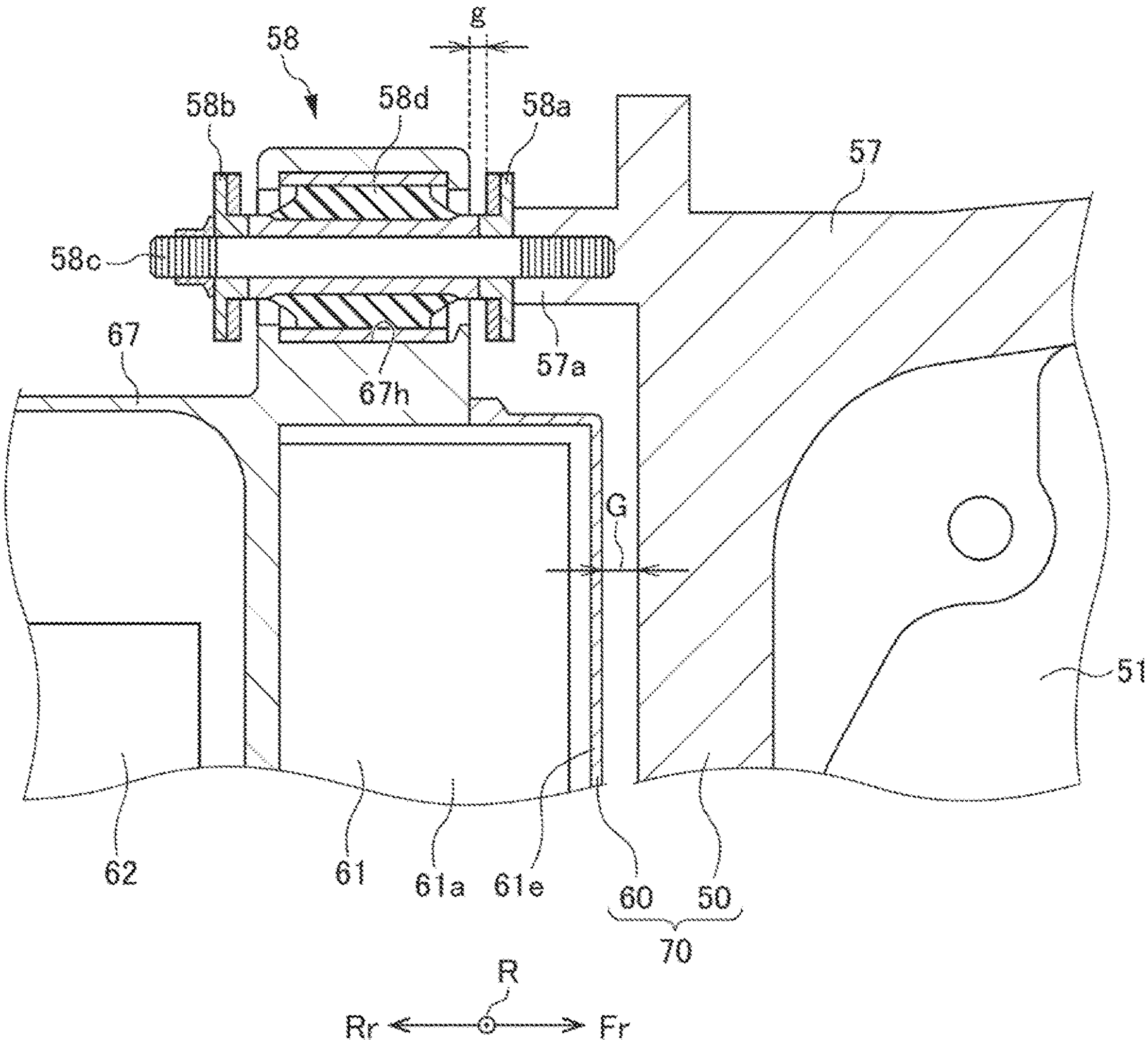
FIG. 4 is a sectional side view illustrating the connection between the attachment and the outboard machine body.

FIG. 4 is a sectional side view of the damper 58 of the upper arm 57*a* as observed from the right R. The damper 58 has an insertion member 58*c*, an elastic member 58*d*, a front regulating part 58*a*, and a rear regulating part 58*b*. The insertion member 58*c* is a shaft member that extends in the front-rear direction Fr-Rr and is attached to the rear end of the upper arm 57*a* to protrude to the rear side Rr from the rear end of the upper arm 57*a*. The insertion member 58*c* is inserted in an insertion hole 67*h* that penetrates the housing 67 in the front-rear direction Fr-Rr. The elastic member 58*d* is, for example, a rubber member, and is joined to an outer peripheral surface of the insertion member 58*c* and an inner peripheral surface of the insertion hole 67*h*.

The front regulating part 58*a* is arranged on the insertion member 58*c* on the front side Fr of the insertion hole 67*h* to regulate a forward stroke for the damper 58 to absorb impact. The rear regulating part 58*b* is arranged on the insertion member 58*c* on the rear side Rr of the insertion hole 67*h* to regulate a rearward stroke for the damper 58 to absorb impact.

Upon a forward external force being applied to the outboard machine body 60, the rear surface of the front regulating part 58*a* comes into contact with the front surface of the housing 67 before loss of the protective gap G. Thus, the front regulating part 58*a* also functions as a stopper that prevents loss of the protective gap G. Thus, when no external force is applied to the outboard machine body 60 in the front-rear direction, a gap g provided in the front-rear direction between the front surface of the housing 67 and the front regulating part 58*a* is smaller than the protective gap G.

The controller 61 includes a front cover 61*e* that covers the controller case 61*a* from the front Fr, and a gap between a front surface of the front cover 61*e* and the attachment 50 serves as the protective gap G.

The damper 58 of the lower arm 57*b* is configured in the same manner as the damper 58 of the upper arm 57*a* described above.

Figure 5:
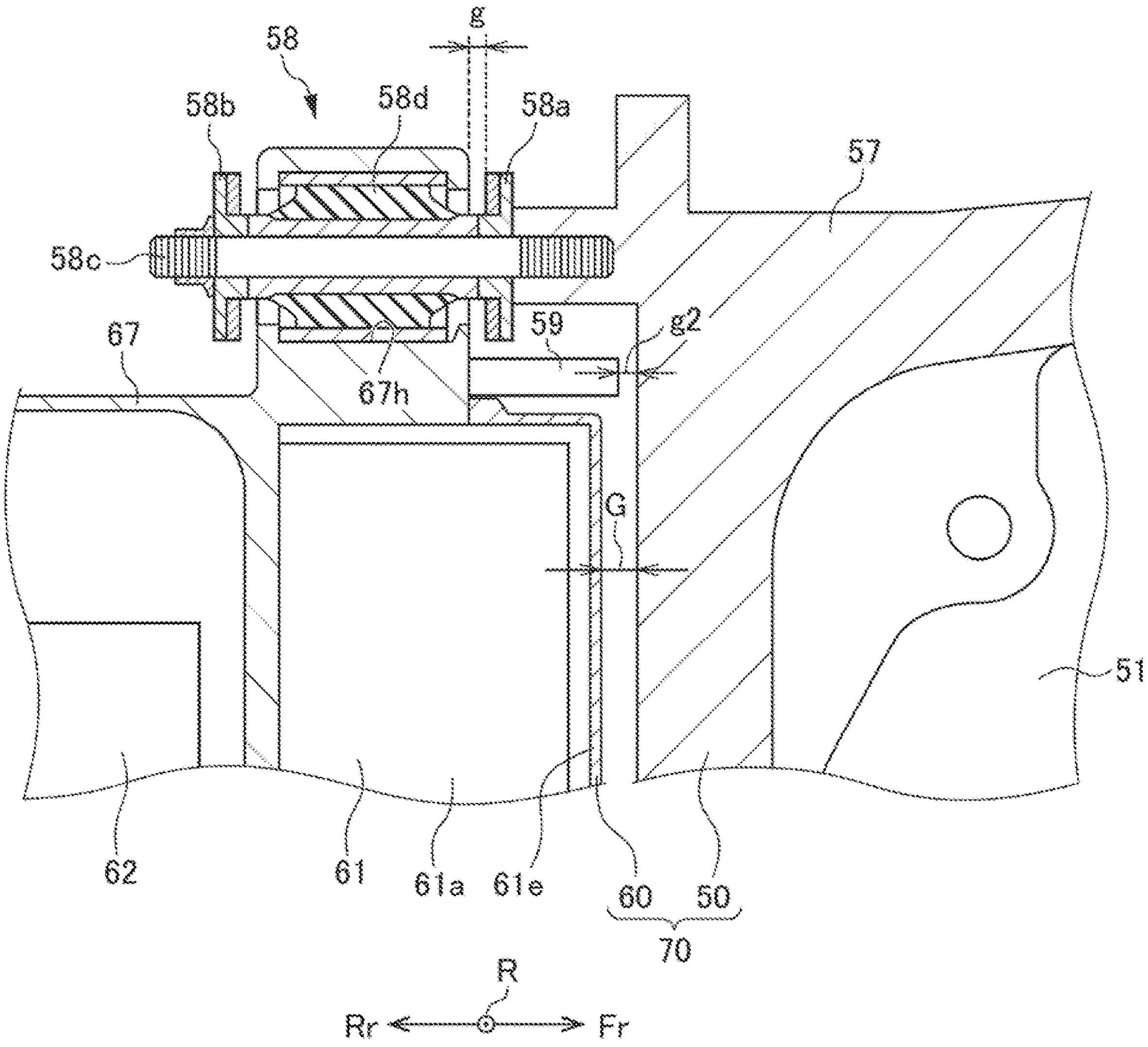
FIG. 5 is a sectional side view illustrating a variation of an example shown in FIG. 4.

FIG. 5 is a view illustrating a variation of FIG. 4. The outboard machine body 60 may further include a protrusion 59 that protrudes forward Fr beyond the front surface of the controller 61. The protrusion 59 serves as a stopper that prevents loss of the protective gap G in place of or together with the front regulating part 58*a*. Specifically, upon a forward external force being applied to the outboard machine body 60, a front end of the protrusion 59 comes into contact with the attachment 50 before loss of the protective gap G. Thus, when no external force is applied to the outboard machine body 60 in the front-rear direction, a gap g2 provided in the front-rear direction between the front end of the protrusion 59 and the attachment 50 is smaller than the protective gap G.

Figure 6:
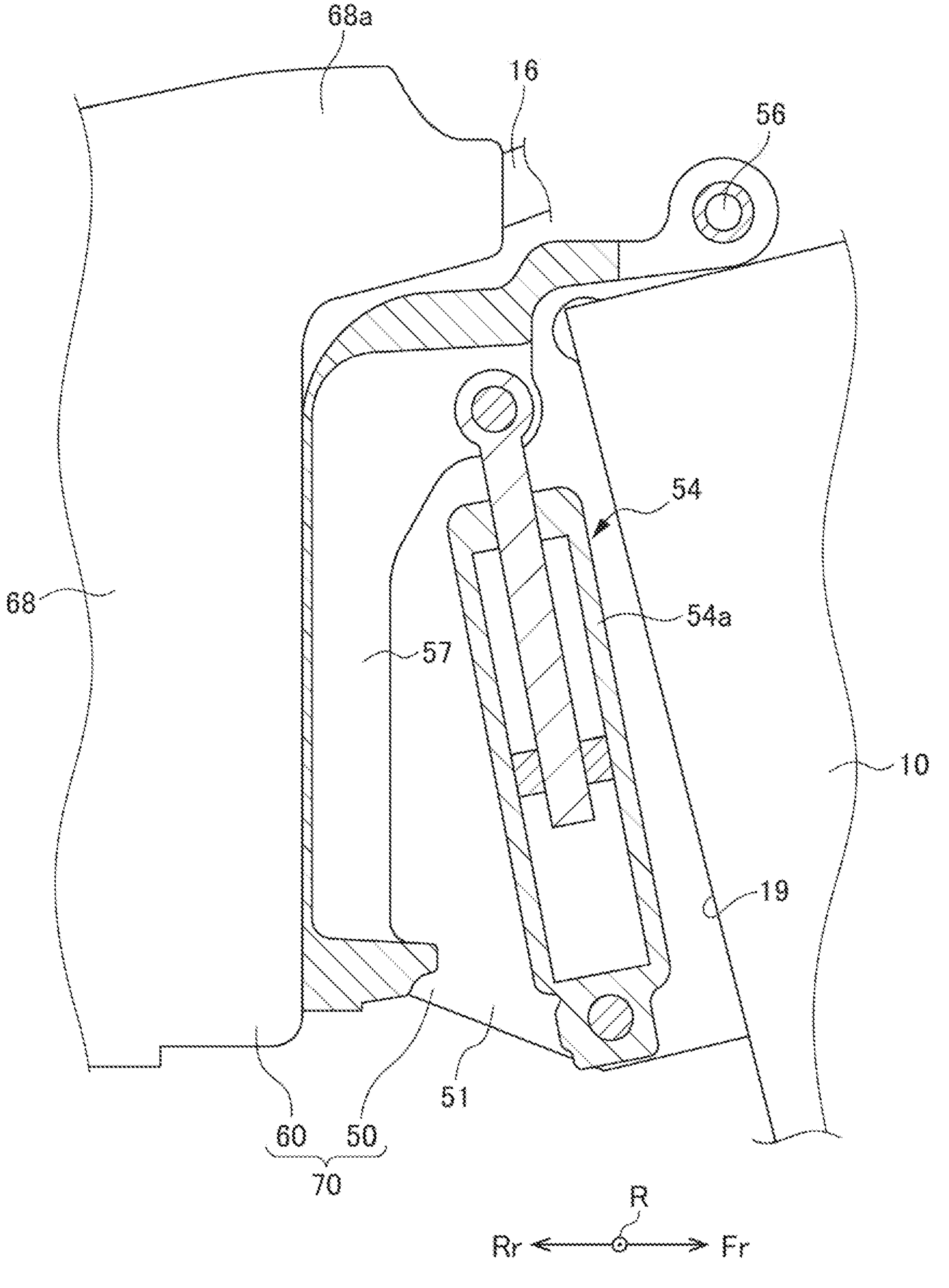
FIG. 6 is a sectional side view illustrating a tilt device of the attachment.

FIG. 6 is a sectional side view illustrating a tilt device 54. The tilt device 54 includes an actuator 54*a*. The actuator 54*a* allows the swivel 57 to rotate relative to the fixing part 51 to tilt the outboard machine body 60 based on a command from a pilothouse on the boat 10. The actuator 54*a* may be, for example, a cylinder such as a hydraulic cylinder as shown in FIG. 6, or may be another motor different from the motor 62.

Figure 7:
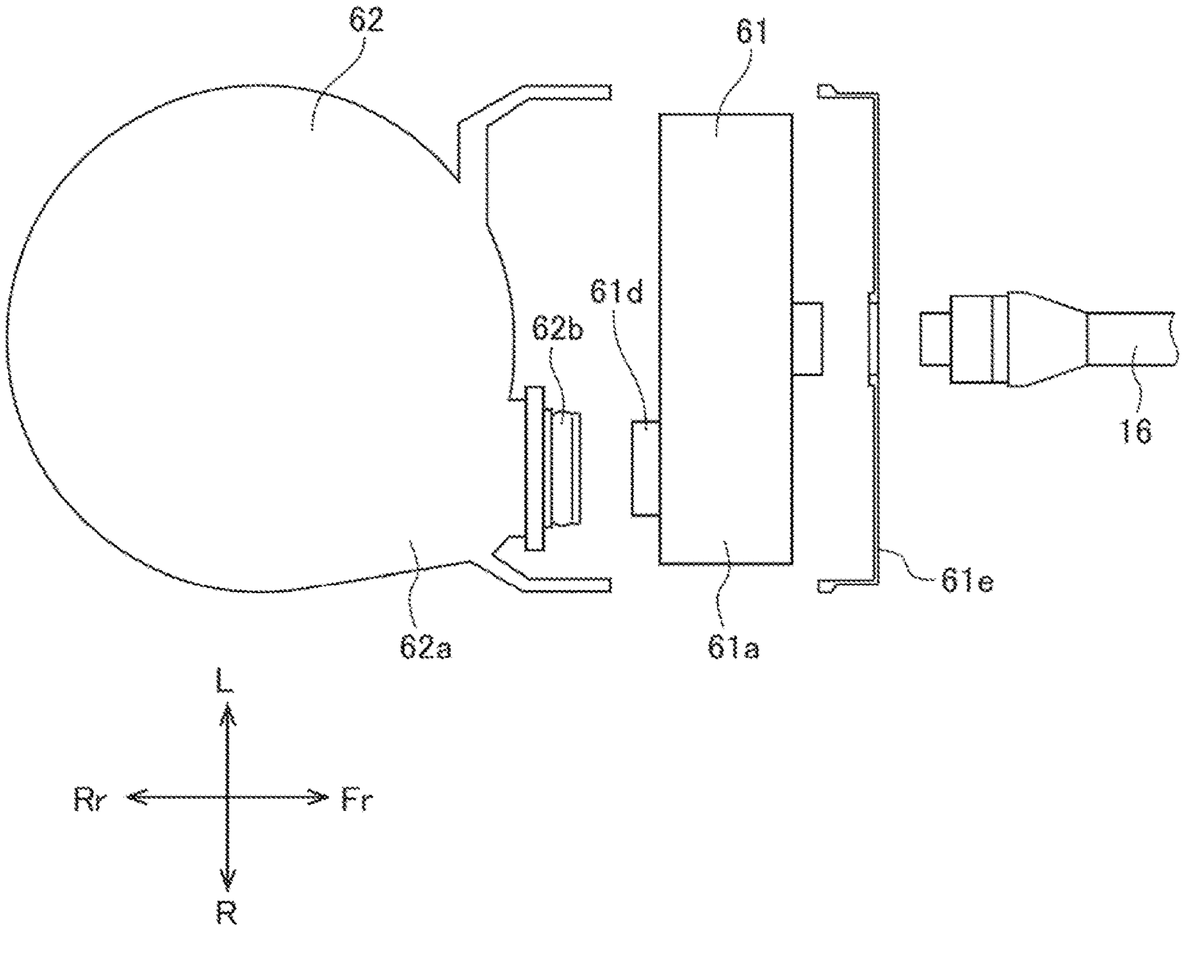
FIG. 7 is an exploded plan view illustrating a controller and a motor.

FIG. 7 is an exploded plan view illustrating the controller 61 and the motor 62. As described above, the controller connector 61*d* in the controller case 61*a* and the motor connector 62*b* in the motor case 62*a* engage with each other to electrically connect the controller 61 and the motor 62.

The configuration and advantages of the present embodiment will be summarized below.

The controller 61 is located between the motor 62 and the attachment 50. Thus, if another boat collides with the boat 10 from behind, the controller 61 is easily protected from the impact of the rear-end collision. This can improve impact resistance of the electric outboard machine 70.

The battery 15 in the boat 10 supplies the DC power to the controller 61 via the DC cable 16, and the controller 61 converts the DC power to the AC power to supply the AC power to the motor 62. In this point, the controller 61 located between the boat 10 and the motor 62 can efficiently shorten the DC cable 16. Compared with when the controller 61 is arranged on the rear side Rr of the motor 62, i.e., when the controller 61 and the battery 15 are arranged to sandwich the motor 62, no space is required for routing the DC cable 16 above or on the side of the motor 62. This leads to downsizing of the outboard machine body.

Each of the attachment 50 and the housing 67 has a larger width in the left-right direction L-R than the controller case 61*a*, and has a left and right edge located outward of a left and right edge of the controller case 61*a* in the left and right direction. This configuration can easily protect the controller 61 from impact applied in the left-right direction L-R.

The protective gap G is provided between the front surface of the controller 61 and the attachment 50. Thus, although a forward external force is applied to the outboard machine body 60 upon rear-end collision, the controller 61 is not crushed between the motor 62 and the attachment 50 unless the protective gap G is lost.

Due to application of the forward external force, the front surface of the housing 67 comes into contact with the front regulating part 58*a* on the front side Fr of the damper 58 before loss of the protective gap G. This can avoid adverse effects, such as crushing of the controller 61 due to loss of the protective gap G when forward impact is excessively absorbed by the damper 58.

When the outboard machine body 60 includes the protrusion 59 that protrudes forward Fr beyond the front surface of the controller 61 as described in the above variation, the front end of the protrusion 59 comes into contact with the attachment 50 before loss of the protective gap G, preventing loss of the protective gap G.

When turning the boat, the lower unit 60*b* rotates relative to the upper unit 60*a* including the controller 61 and the motor 62. Thus, the controller 61 and the motor 62 do not rotate, and the DC cable 16 that supplies the power to the controller 61 and the motor 62 does not rotate. This can reduce damage to the DC cable 16. Moreover, there is no need to save space for the DC cable 16 to bend during the turn, or to make the DC cable 16 longer to be able to bend. This leads to downsizing of the outboard machine body 60.

OTHER EMBODIMENTS

The embodiments described above may be modified as follows, for example. The motor 62 may be a DC motor and the controller 61 may have no inverter 61*c*. The dampers 58 may be omitted so that the arms 57*a* and 57*b* of the swivel 57 may directly support the housing 67 without the dampers 58.

EXPLANATION OF REFERENCE NUMERALS

- 10 Boat
- 15 Battery
- 16 DC Cable
- 50 Attachment
- 58 Damper
- 58*a* Front regulating part as stopper
- 59 Protrusion as stopper
- 60 Outboard machine body
- 61 Controller
- 62 Motor
- 66 Propeller
- 67 Housing
- 68 Cover
- 70 Electric outboard machine
- G Protective gap as a gap provided in a front-rear direction between a front surface of the controller and the attachment

What is claimed is:

1. An electric outboard machine, comprising:

an outboard machine body including a propeller, an electric motor that drives the propeller, and a controller that controls the motor; and an attachment for attaching the outboard machine body to a rear part of a boat, wherein the controller is located between the motor and the attachment.

2. The electric outboard machine of claim 1, wherein the boat is equipped with a battery, a DC cable that supplies power from the battery to the controller is routed, and the power is supplied from the controller to the motor.

3. The electric outboard machine of claim 1, wherein the controller includes a control circuit that controls the motor and a controller case that houses the control circuit, and the attachment is wider than the controller case in a lateral direction of the boat, and an edge of the attachment in the lateral direction of the boat is located outward of an edge of the controller case in the lateral direction of the boat.

4. The electric outboard machine of claim 1, wherein the outboard machine body includes a housing that houses the motor, and the housing is wider than the controller in a lateral direction of the boat, and an edge of the housing in the lateral direction of the boat is located outward of an edge of the controller in the lateral direction of the boat.

5. The electric outboard machine of claim 1, wherein a gap is provided between a front surface of the controller and the attachment in a case where no external force is applied to the electric outboard machine in a front-rear direction of the boat.

6. The electric outboard machine of claim 5, wherein a stopper is provided to one selected from the outboard machine body and the attachment, and, in a case where a forward external force is applied to the electric outboard machine, the stopper contacts the other one selected from the outboard machine body and the attachment before loss of the gap to prevent loss of the gap.

7. The electric outboard machine of claim 6, wherein the attachment supports the outboard machine body via a damper that absorbs impact in the front-rear direction, and a regulating part that regulates a stroke for the damper to absorb the impact serves as the stopper.

8. The electric outboard machine of claim 6, wherein the outboard machine body includes a protrusion that protrudes forward beyond a front surface of the controller, and the protrusion serves as the stopper.

9. The electric outboard machine of claim 1, further comprising: a drive shaft that transmits power of the motor to the propeller, wherein the outboard machine body includes an upper unit including the controller and the motor and a lower unit including the propeller, and in a case of turning to change a traveling direction of the boat, the lower unit rotates about an axis of the drive shaft relative to the upper unit.

* * * * *